US010691503B2

(12) United States Patent
Li et al.

(10) Patent No.: US 10,691,503 B2
(45) Date of Patent: Jun. 23, 2020

(54) LIVE MIGRATION OF VIRTUAL MACHINE WITH FLOW CACHE IN IMPROVED RESTORATION SPEED

(71) Applicant: Alibaba Group Holding Limited, Grand Cayman (KY)

(72) Inventors: Jingxuan Li, Hangzhou (CN); Junwei Zhang, Hangzhou (CN); Jinsong Liu, Hangzhou (CN); Honghao Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 73 days.

(21) Appl. No.: 15/612,996

(22) Filed: Jun. 2, 2017

(65) Prior Publication Data
US 2017/0351556 A1 Dec. 7, 2017

(30) Foreign Application Priority Data
Jun. 3, 2016 (CN) .......................... 2016 1 0392077

(51) Int. Cl.
*G06F 9/50* (2006.01)
*G06F 9/455* (2018.01)
*G06F 12/0875* (2016.01)

(52) U.S. Cl.
CPC ........ *G06F 9/5088* (2013.01); *G06F 9/45558* (2013.01); *G06F 12/0875* (2013.01);
(Continued)

(58) Field of Classification Search
None
See application file for complete search history.

(56) References Cited

U.S. PATENT DOCUMENTS 7,865,752 B2 * 1/2011 Brabenac .............. H04L 43/028
713/323
8,756,602 B2 6/2014 Narayanasamy et al.
(Continued)

FOREIGN PATENT DOCUMENTS

CN 104636185 A 5/2015

OTHER PUBLICATIONS

PCT Search Report and Written Opinion dated Aug. 15, 2017 for PCT Application No. PCT/US17/35830, 10 pages.
(Continued)

*Primary Examiner* — Meng Ai T An
*Assistant Examiner* — Zujia Xu
(74) *Attorney, Agent, or Firm* — Lee & Hayes, P.C.

(57) ABSTRACT

A method for live migration of a virtual machine includes receiving a data packet that is sent to a migrated virtual machine on the source physical machine in a stage when the migrated virtual machine is suspended, and caching the received data packet; and sending the cached data packet to the migrated virtual machine on the destination physical machine after it is sensed that the migrated virtual machine is restored at the destination, to speed up restoration of a TCP connection inside the virtual machine. The apparatus of the present disclosure includes a caching unit and a data restoration unit. The method and apparatus of the present disclosure improve a restoration speed of the TCP connection, make live migration of a virtual machine more imperceptible for users, and improve user experience.

17 Claims, 4 Drawing Sheets

(52) U.S. Cl.
CPC ............ *G06F 2009/4557* (2013.01); *G06F 2009/45583* (2013.01); *G06F 2009/45595* (2013.01); *G06F 2212/452* (2013.01)

(56) References Cited

U.S. PATENT DOCUMENTS

| | | | |
|---|---|---|---|
| 8,924,534 B2 | 12/2014 | Suri et al. | |
| 9,065,854 B2 | 6/2015 | Goyal et al. | |
| 9,319,335 B1 | 4/2016 | Tripathi | |
| 2010/0071025 A1 | 3/2010 | Devine et al. | |
| 2011/0213911 A1 | 9/2011 | Eidus et al. | |
| 2011/0268113 A1* | 11/2011 | Suzuki | G06F 9/4856 370/389 |
| 2012/0017031 A1 | 1/2012 | Mashtizadeh et al. | |
| 2012/0096459 A1* | 4/2012 | Miyazaki | G06F 9/45558 718/1 |
| 2014/0297979 A1 | 10/2014 | Baron et al. | |
| 2015/0043581 A1 | 2/2015 | Devireddy et al. | |
| 2015/0052282 A1 | 2/2015 | Dong | |
| 2015/0242159 A1 | 8/2015 | Tsirkin | |
| 2015/0244617 A1 | 8/2015 | Nakil et al. | |
| 2015/0309839 A1 | 10/2015 | Lu | |
| 2016/0034303 A1* | 2/2016 | Aslam | G06F 12/0806 711/124 |
| 2016/0156746 A1* | 6/2016 | Deng | H04L 67/04 370/467 |
| 2016/0196158 A1* | 7/2016 | Nipane | G06F 9/45558 718/1 |
| 2016/0299853 A1* | 10/2016 | Kauer | G06F 12/1027 |
| 2017/0286158 A1 | 10/2017 | Dai et al. | |
| 2017/0351556 A1 | 12/2017 | Li et al. | |
| 2018/0337960 A1* | 11/2018 | Marfia | H04L 63/306 |

OTHER PUBLICATIONS

Extended European Search Report dated Dec. 16, 2019 for European Patent Application No. 17807624.6, 7 pages.
PCT International Preliminary report on Patentability dated Dec. 13, 2018 for PCT Application No. PCT/US17/35830, 9 pages.

* cited by examiner

LIVE MIGRATION OF VIRTUAL MACHINE WITH FLOW CACHE IN IMPROVED RESTORATION SPEED

CROSS REFERENCE TO RELATED PATENT APPLICATIONS

This application claims priority to Chinese Patent Application No. 201610392077.7, filed on Jun. 3, 2016, entitled "METHOD AND APPARATUS FOR LIVE MIGRATION OF VIRTUAL MACHINE," which is hereby incorporated by reference in its entirety.

TECHNICAL FIELD

The present disclosure relates to the technical field of virtual machine live migration, and, more particularly, to a method and an apparatus for live migration of a virtual machine.

BACKGROUND

Live migration of a virtual machine: Live Migration (also known as dynamic migration or real-time migration), i.e., save/restore of a virtual machine, which means completely saving a running state of the whole virtual machine, and meanwhile, quickly restoring the virtual machine on a hardware platform with the same configuration as the original hardware platform or even a different hardware platform. After restoration, the virtual machine will still run smoothly, and a user will not notice any difference. Currently, major live migration technologies include XenMotion, VMotion of VMware, Hyper-V Live Migration of Microsoft, and the like.

Generally, in a process of migrating a virtual machine from a (source) physical machine to another (destination) physical machine, memory of the source virtual machine needs to be copied to the destination, and during copying, the memory of the source virtual machine constantly changes. Therefore, the source virtual machine needs to be suspended finally, that is, an operating system suspends operations on processes of the source virtual machine, so that the memory of the source virtual machine does not change any more. Moreover, all "dirty memory" of the source virtual machine is copied to the destination, to keep memory of a destination virtual machine the same as that of the source, so that a state of the virtual machine restored at the destination remains the same as the state before suspension. Restarting the virtual machine at the destination after the source virtual machine is suspended needs a period of time, and in this period, the virtual machine is unusable. Duration of this period is related to the size of "dirty memory" of the virtual machine that is copied in the final round, and when the "dirty memory" is relatively large, the final round of copying takes a relatively long time, and thus the virtual machine is unusable in a relatively long time. Therefore, a Transmission Control Protocol (TCP) connection inside the virtual machine receives no data packet from a peer in a longer time, and the peer does not receive any response from the migrated virtual machine in an even longer time. A timeout retransmission interval of the TCP doubles each time, and in this case, it takes a longer time to restore the TCP connection.

However, in the virtual machine live migration technologies in the conventional techniques, there is no method for rapidly restoring a TCP connection, and the only option is to wait for timeout retransmission of the connection or establish a new connection again.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present disclosure is to provide a method and an apparatus for live migration of a virtual machine, to solve the technical problem of slow network flow restoration of a TCP session during live migration of a virtual machine in the conventional techniques, to restore the flow of a TCP connection as quickly as possible and reduce a network flow jitter time.

To implement the foregoing objective, the technical solution of the present disclosure is as follows:

A method for live migration of a virtual machine is used to migrate a virtual machine from a source physical machine to a destination physical machine, and the method for live migration of a virtual machine includes:

receiving a data packet that is sent to a migrated virtual machine on the source physical machine in a stage when the migrated virtual machine is suspended, and caching the received data packet; and sending the cached data packet to the migrated virtual machine on the destination physical machine after it is sensed that the migrated virtual machine is restored at the destination.

Before the receiving a data packet that is sent to a migrated virtual machine on the source physical machine in a stage when the migrated virtual machine is suspended, the method further includes:

receiving a start instruction, and hooking a callback function of processing logic to a back-end network adapter included in the start instruction, where the back-end network adapter is a virtual network adapter of the destination physical machine for external communication, and the back-end network adapter of the destination physical machine has a same configuration as a back-end network adapter of the source physical machine.

Before the caching the received data packet, the method further includes:

determining whether the received data packet is a TCP data packet; if yes, performing subsequent processing; otherwise, performing no processing.

Further, the caching the received data packet includes:

calculating a corresponding hash value according to a source IP, a source port, a destination IP, and a destination port of the data packet, and saving the hash value as a Flow_Node; and;

placing Flow_Nodes having a same hash value in a single linked list of a same hash node, where all hash nodes form a hash table.

Further, the Flow_Node saves a maximum of 3 data packets with largest TCP sequence numbers of a same TCP flow and 1 acknowledgement packet with a largest sequence number.

The present disclosure further provides an apparatus for live migration of a virtual machine, used to migrate a virtual machine from a source physical machine to a destination physical machine, and the apparatus for live migration of a virtual machine includes:

a caching unit configured to receive a data packet that is sent to a migrated virtual machine on the source physical machine in a stage when the migrated virtual machine is suspended, and cache the received data packet; and a data restoration unit configured to send the cached data packet to the migrated virtual machine on the destination physical machine after it is sensed that the migrated virtual machine is restored at the destination.

The caching unit, before receiving the data packet that is sent to the migrated virtual machine on the source physical machine in the stage when the migrated virtual machine is suspended, is further configured to perform the following operation:

receiving a start instruction, and hooking a callback function of processing logic to a back-end network adapter included in the start instruction, where the back-end network adapter is a virtual network adapter of the destination physical machine for external communication, and the back-end network adapter of the destination physical machine has a same configuration as a back-end network adapter of the source physical machine.

The caching unit, before caching the received data packet, is further configured to perform the following operation:

determining whether the received data packet is a TCP data packet; if yes, performing subsequent processing; otherwise, performing no processing.

Further, the caching unit, when caching the received data packet, performs the following operations:

calculating a corresponding hash value according to a source IP, a source port, a destination IP, and a destination port of the data packet, and saving the hash value as a Flow_Node; and placing Flow_Nodes having a same hash value in a single linked list of a same hash node, where all hash nodes form a hash table.

Further, the Flow_Node saves a maximum of 3 data packets with largest TCP sequence numbers of a same TCP flow and 1 acknowledgement packet with a largest sequence number.

The present disclosure further provides one or more memories stored thereon computer readable instructions that, when executed by one or more processors, cause the one or more processors to perform acts comprising:

receiving a data packet that is sent to a migrated virtual machine on a source physical machine in a stage when the migrated virtual machine is suspended;

caching the received data packet; and sending the cached data packet to the migrated virtual machine on a destination physical machine after the migrated virtual machine is restored at the destination.

The features in the above example embodiments may be referenced to each other.

In the method and apparatus for live migration of a virtual machine provided in the present disclosure, in a stage when a migrated virtual machine is suspended, TCP data packets sent to the virtual machine are cached, and the data packets are sent to the virtual machine after the virtual machine is restored at a destination, to speed up restoration of a TCP connection inside the virtual machine, thus improving a restoration speed of the TCP connection. For a client, live migration of a virtual machine is made more imperceptible for a user of the virtual machine, thereby improving user experience.

DETAILED DESCRIPTION

The technical solutions of the present disclosure are further described in detail below with reference to the accompanying drawings and example embodiments, and the following example embodiments represent merely some embodiments of the present disclosure and do not constitute limitation to the present disclosure.

In this example embodiment, live migration of Xen on a Linux operating system is used as an example, and this example embodiment is also applicable to KVM, VMotion of VMware, and Hyper-V Live Migration of Microsoft. In principle, this example embodiment can be implemented on any operating system and virtualization software supporting live migration of a virtual machine.

Figure 1:
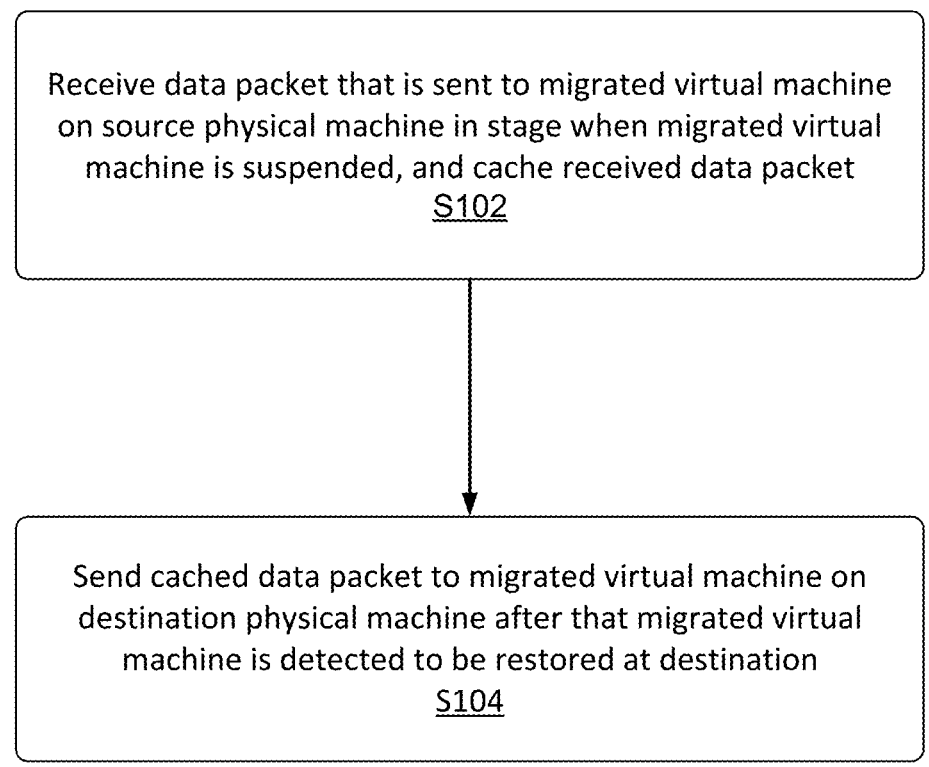
FIG. 1 is a flowchart of a method for live migration of a virtual machine according to the present disclosure.

A method for live migration of a virtual machine in this example embodiment is implemented by using a destination physical machine, and specifically, is implemented by using a flow cache management module (flowcache module) pre-installed on the destination physical machine. As shown in FIG. 1, the method for live migration of a virtual machine in this example embodiment includes:

Step S102: receiving a data packet that is sent to a migrated virtual machine on a source physical machine in a stage when the migrated virtual machine is suspended, and caching the received data packet.

Generally, in a process of migrating a virtual machine from a (source) physical machine to another (destination) physical machine, memory of the source virtual machine needs to be copied to the destination, and during copying, the memory of the source virtual machine constantly changes. Therefore, the source virtual machine needs to be suspended. In a Linux operating system, suspending a virtual machine means temporarily stopping operations on processes of the virtual machine, so that the memory of the virtual machine does not change any more. Moreover, all "dirty memory" of the source virtual machine is copied to the destination, where the "dirty memory" refers to memory of the source virtual machine that stores data, to keep memory of a destination virtual machine the same as that of the source, so that after the virtual machine is restored at the destination, a state of the virtual machine remains the same as the state before suspension. It needs to take a period of time to restart the virtual machine at the destination after the source virtual machine is suspended. Duration of this period of time is related to the size of "dirty memory" of the virtual machine that is copied in the final round, and when the "dirty memory" is relatively large, the final round of copying takes a relatively long time, and thus the virtual machine is unusable in a relatively long time. Because the virtual machine is unusable in a relatively long time, it easily causes a relatively long restoration time of a TCP connection, thus affecting user experience.

In this example embodiment, the virtual machine serves as one end, another end communicating with the virtual machine is called a peer, and the peer communicating with the virtual machine may be a software program or a hardware device. During migration of the virtual machine, the peer communicating with the virtual machine does not know that the virtual machine is suspended, and may still send data packets to the virtual machine. In the present disclosure, restoration of a TCP connection is accelerated by caching data packets that are sent by the peer to the virtual machine in a stage when the virtual machine is suspended during migration.

Using live migration of Xen as an example, after live migration begins, the migrated virtual machine (Mig-VM) is suspended at the source, and after several rounds of memory copying, the Xen copies "dirty memory" of the Mig-VM in the final round and some configuration information from the source physical machine to the destination physical machine, and at the destination, the Mig-VM uses an IP address the same as that at the source.

The Xen system of the destination physical machine may run an Xend process, and the Xend process may send a start instruction to the flowcache module during migration of the virtual machine. This instruction may include a name of the virtual machine Mig-VM on which live migration is going to be carried out, and a name of a back-end network adapter. In this example embodiment, a virtual network adapter on a physical machine for external communication is referred to as a back-end network adapter; and a virtual network adapter on the virtual machine Mig-VM for connection to the back-end network adapter is referred to as a front-end network adapter. The virtual machine can receive external data packets only after the front-end and back-end network adapters are connected. After receiving the start instruction, a destination flowcache may hook a callback function of processing logic to the back-end network adapter. Because parameters (such a network adapter name) of the source back-end network adapter and the destination back-end network adapter are set to be the same, after the migrated virtual machine is hooked at the source, during live migration, all data packets arriving at the back-end network adapter of the Mig-VM will be captured by the destination flowcache.

Figure 2:
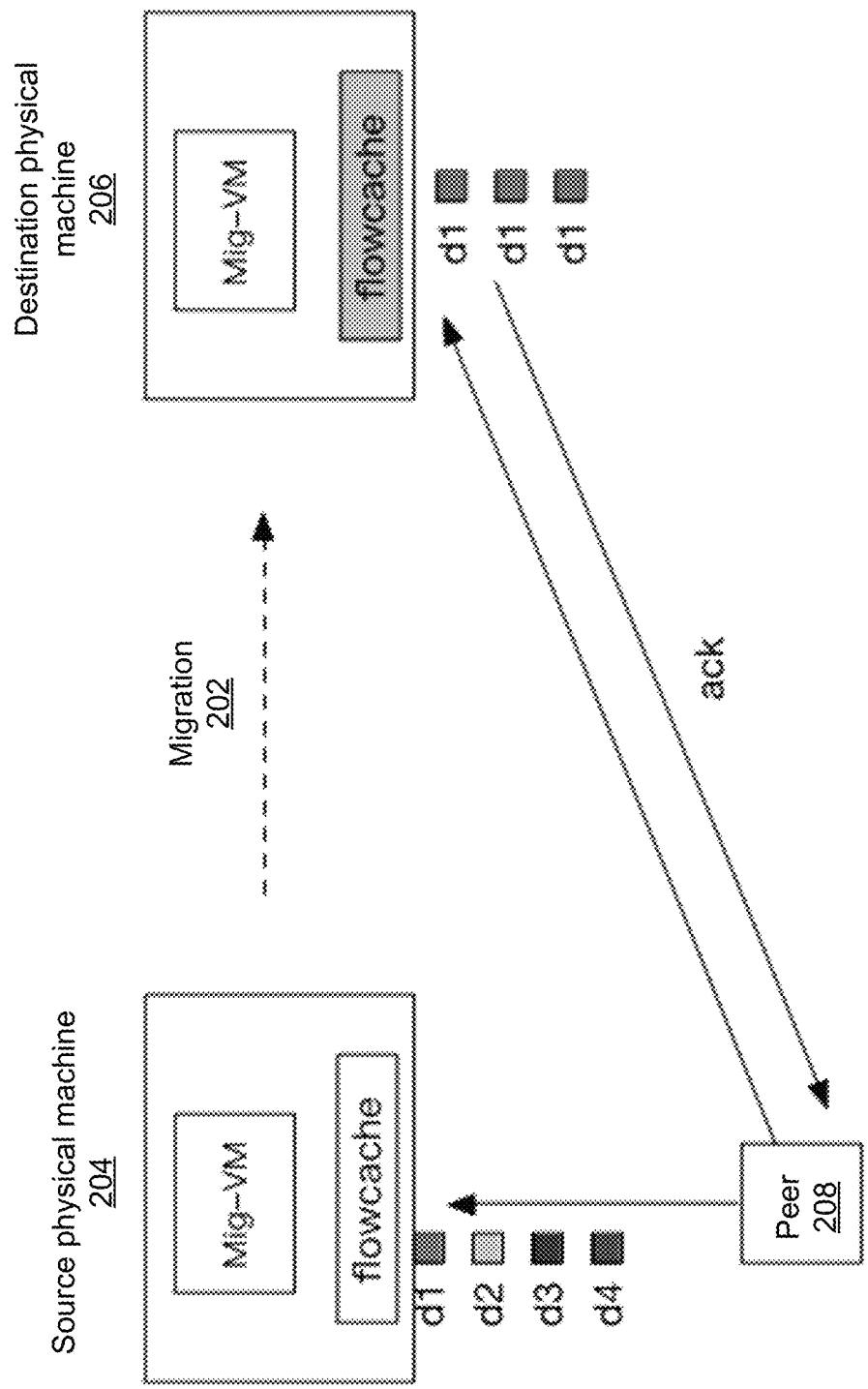
FIG. 2 is a schematic diagram of sending a data packet according to an example embodiment of the present disclosure.

Because the Mig-VM is suddenly suspended, if the peer communicating with the Mig-VM is sending a data packet to the Mig-VM through a TCP before the Mig-VM is suspended, the peer may fail to receive an ACK acknowledgement packet from the Mig-VM all of a sudden. FIG. 2 shows an example migration 202 of a virtual machine from a source physical machine 204 to a destination physical machine 206. It is assumed that d1, d2, d3, and d4 are data packets for which acknowledgement is not received. According to a design principle of the TCP, after a retransmission timeout (RTO) time elapses since d1 is sent out, a minimum value of the RTO time is 200 ms by default in Linux, and a peer 208 will retransmit d1 to the Mig-VM.

In this example embodiment, after the Mig-VM is suspended, in order to avoid the foregoing phenomenon, a flow of the peer communicating with the Mig-VM is guided to the destination physical machine by sending a free ARP or in another manner.

Therefore, the flow cache management module flowcache is disposed on the destination physical machine, to receive and cache a data packet that is sent, by the peer communicating with the virtual machine, to the virtual machine in a stage when the virtual machine is suspended during migration.

In this way, the retransmitted data packet d1 sent by the peer will be sent to the destination physical machine, and the flowcache runs in a kernel mode of the destination physical machine; the flowcache caches a TCP flow of the Mig-VM before the Mig-VM is connected to a network. For example, a maximum of 3 data packets (SEQ) and 1 acknowledgement packet (ACK) are cached in each flow.

It should be noted that, in this example embodiment, the flow cache management module is disposed on the destination physical machine, and starts working after receiving the start instruction sent by the Xend process, to hook the callback function of the processing logic to the back-end network adapter specified in the start instruction. Alternatively, manual setting may be performed on the processing logic callback function of the flow cache management module in advance, so that the callback function is hooked to the back-end network adapter included in the start instruction, namely, the back-end network adapter of the destination physical machine.

Generally, caching of the TCP flow specifically occurs in a memory or a storage device of the destination physical machine, and details are not described herein.

Step S104: sending the cached data packet to the migrated virtual machine on the destination physical machine after it is detected that the migrated virtual machine is restored at the destination.

At the end of live migration, after the destination Mig-VM is restarted and the front-end and back-end network adapters are connected, the Xend sends an instruction to the flowcache, to instruct the flowcache to send the cached TCP data packet to the Mig-VM. After receiving the instruction, the flowcache senses that the Mig-VM on the destination physical machine is restored, and considers that the front-end network adapter of the Mig-VM has been connected to the back-end network adapter; and the flowcache sends all the cached TCP data packets to the Mig-VM.

Finally, the Mig-VM receives these data packets, and a TCP/IP protocol stack in the Mig-VM may immediately process these connections, to speed up restoration of the connections, without waiting for a next retransmission of the peer. If a Round-Trip Time (RTT) of the connection is so long that after restoration of the live migration at the destination, retransmission of the TCP connection is not started yet (which is very likely because a Downtime of live migration is less than 500 ms when dirty memory of the Mig-VM is relatively small), the Mig-VM may return an ACK after receiving the data packets. Before the Mig-VM is suspended, if a sequence number of a right edge of a sliding window of the TCP connection is smaller than a sequence number of a TCP data packet sent by the flowcache to the Mig-VM, and the flowcache sends 3 data packets to the Mig-VM, according to a fast retransmission and fast restoration algorithm, the peer may directly retransmit the ACK data packets of the Mig-VM; and the connection is restored and slow start will not be performed again. Before the Mig-VM is suspended, if the sequence number of the right edge of the sliding window of the TCP connection is the same as the sequence number of the TCP data packet sent by the flowcache to the Mig-VM, the peer may consider that no data packet is lost, and the connection is restored directly.

For example, after receiving the data packet sent by the flowcache, the TCP protocol stack of the Mig-VM still considers that the data packet is a data packet sent by the peer thereto, and therefore may return an ACK in response to d1. The peer receives the ACK sent by the Mig-VM, and considers that d2 is lost; therefore, the peer retransmits data packets starting from d2. In this way, the TCP connection is restored.

It should be noted that, generally, restoration of a non-TCP flow such as a UDP during migration of a virtual machine does not need to be considered. Therefore, for example, when caching the data packet, the method for live migration of a virtual machine of this example embodiment further includes the following step:

determining whether the received data packet is a TCP data packet; if yes, caching the data packet; otherwise, performing no processing.

Therefore, only the TCP flow is cached, thus facilitating subsequent restoration of the TCP connection.

In this example embodiment, a hash table data structure is used in the flowcache to cache data packets, to accelerate searching and adding. In addition to the hash table, data structures such as a simple linked list, an array, or a search tree may also be directly used for implementation.

Figure 3:
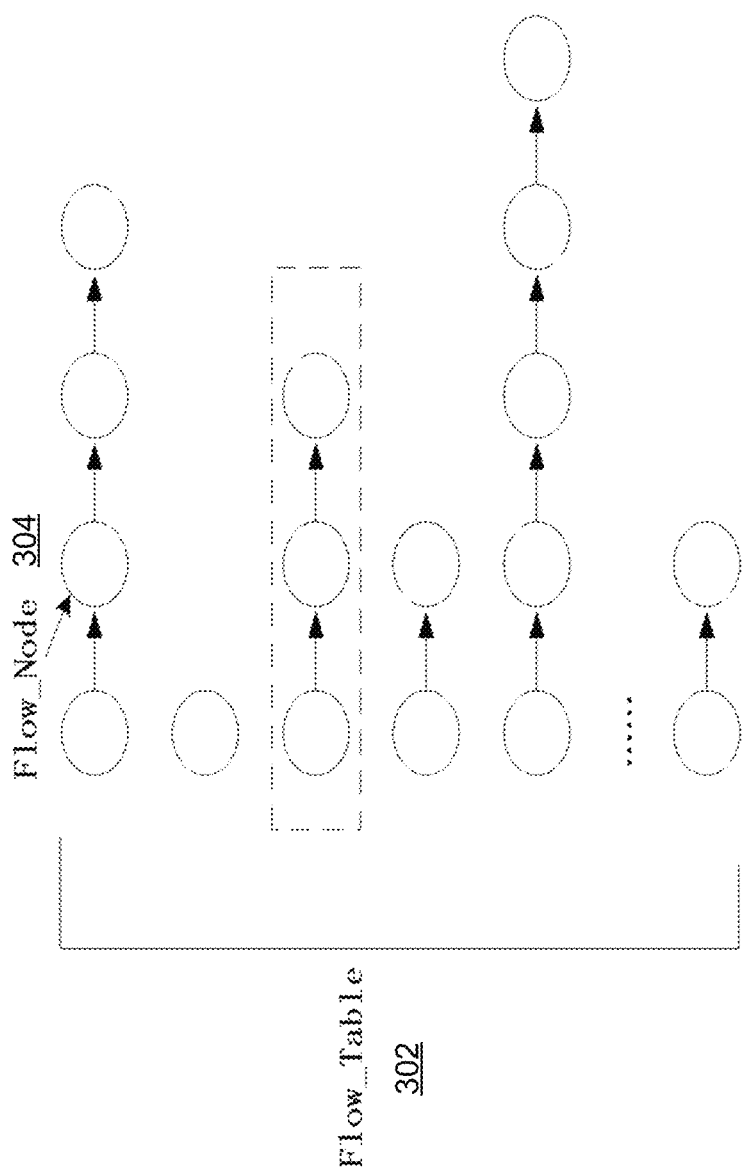
FIG. 3 is a structural diagram of a hash table according to an example embodiment of the present disclosure.

In this example embodiment, there is a Flow_Table in the flowcache, for maintaining all flow connection information. As shown in FIG. 3, a Flow_Table 302 is a hash table, each hash node is a single linked list, and a key of the hash node is a four-tuple (source IP, source port, destination IP, and destination port) hash value of a flow connection. Each Flow_Node 304 represents a flow, and Flow_Nodes having a same four-tuple hash value are put in a single linked list of a same hash node. For example, three Flow_Nodes in the dashed box in FIG. 3 are in a single linked list of a same hash node.

It should be noted that, each Flow_Node saves a maximum of 3 data packets with largest TCP sequence numbers of the received flow and 1 acknowledgement packet (ACK) with a largest sequence number. The flowcache only caches 3 data packets with largest sequence numbers and 1 acknowledgement packet because when the TCP connection supports SACK, a data packet carrying SACK information may inform a transmitting end that which message is lost, and a receiver may directly retransmit the corresponding data packets. When the TCP connection does not support SACK, for example, an attempt to trigger fast retransmission and restoration is made by using a maximum of 3 data packets, to prevent slow start from being triggered again in a scenario where an RTT is relatively large, thus accelerating restoration of the connection. Moreover, saving only 3 data packets also effectively saves cache space, and certainly, saving 4 or 5 data packets is also a feasible technical solution.

Figure 4:
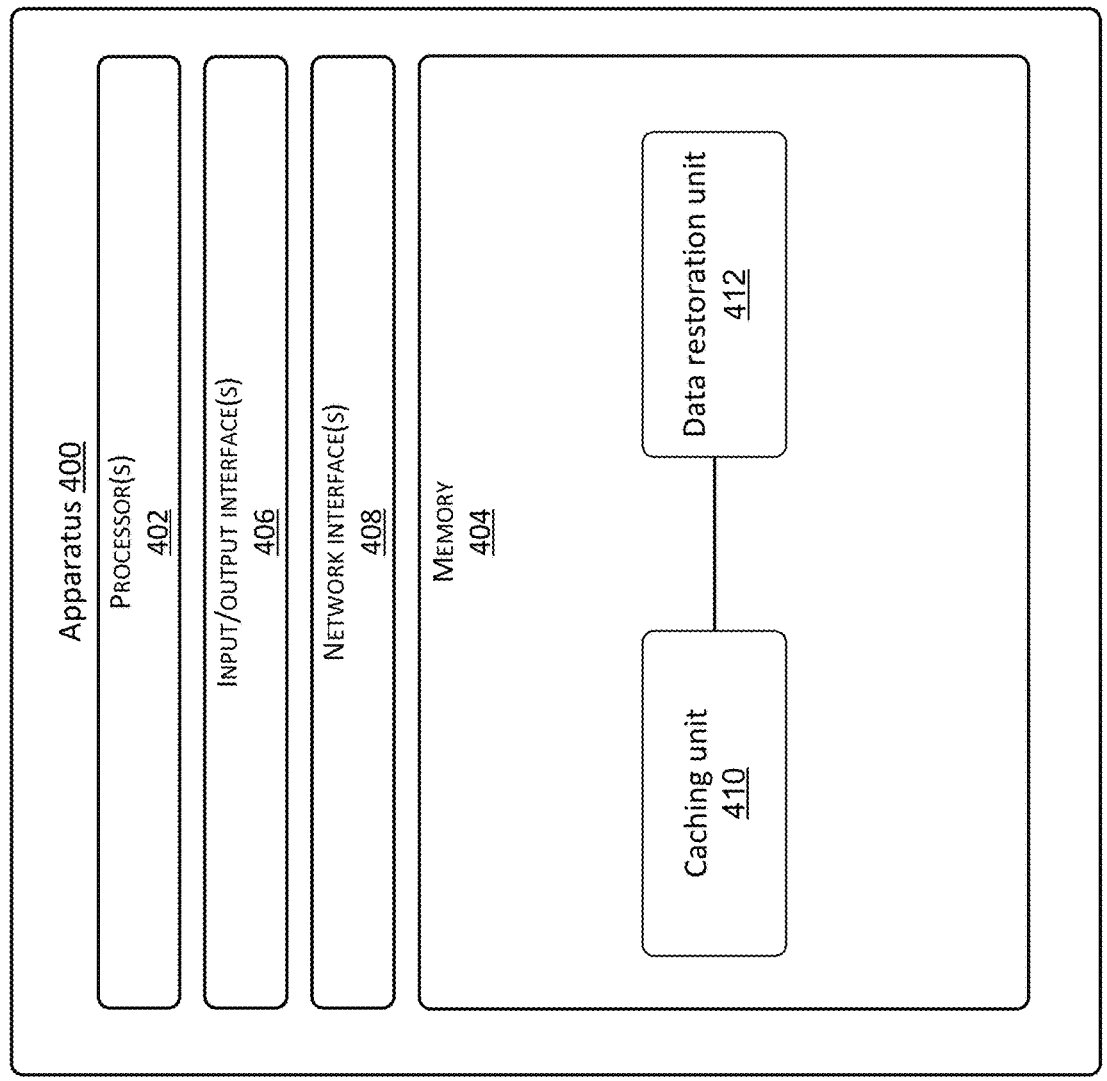
FIG. 4 is a schematic structural diagram of an apparatus for live migration of a virtual machine according to the present disclosure.

As shown in FIG. 4, an apparatus for live migration of a virtual machine of this example embodiment is applied to a destination physical machine, and the apparatus may be a hardware device pre-installed on the destination physical machine, or a computer program running on the destination physical machine. This example embodiment is referred to as a flow cache management module (flowcache module).

In FIG. 4, an apparatus 400 includes one or more processor(s) 402 or data processing unit(s) and memory 404. The device 400 may further include one or more input/output interface(s) 406, and network interface(s) 408. The memory 404 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 404 may store therein a plurality of modules or units including:

a caching unit 410 configured to receive a data packet that is sent to a migrated virtual machine on a source physical machine in a stage when the migrated virtual machine is suspended, and cache the received data packet; and a data restoration unit 412 configured to send the cached data packet to the migrated virtual machine on the destination physical machine after it is sensed that the migrated virtual machine is restored at the destination.

Modules of the apparatus for live migration of a virtual machine in this example embodiment correspond to the foregoing method, are specifically described as follows:

the caching unit 410, in this example embodiment, before receiving the data packet that is sent to the migrated virtual machine on the source physical machine in the stage when the migrated virtual machine is suspended, and caching the received data packet, further performs the following operation:

receiving a start instruction, and hooking a callback function of processing logic to a back-end network adapter included in the start instruction, where the back-end network adapter is a virtual network adapter of the destination physical machine for external communication, and the back-end network adapter of the destination physical machine has a same configuration as a back-end network adapter of the source physical machine.

The caching unit 410 in this example embodiment, before caching the received data packet, further performs the following operation:

determining whether the received data packet is a TCP data packet; if yes, performing subsequent processing; otherwise, performing no processing.

The caching unit 410 in this example embodiment, when caching the received data packet, performs the following operations:

calculating a corresponding hash value according to a source IP, a source port, a destination IP, and a destination port of the data packet, and saving the hash value as a Flow_Node; and placing Flow_Nodes having a same hash value in a single linked list of a same hash node, where all hash nodes form a hash table.

Wherein, the Flow_Node saves a maximum of 3 data packets with largest TCP sequence numbers of a same TCP flow and 1 acknowledgement packet with a largest sequence number.

The above example embodiments are merely used for describing rather than limiting the technical solution of the present disclosure. Those skilled in the art may make various corresponding changes and variations according to the present disclosure without departing from the spirit and substance of the present disclosure, but all these corresponding changes and variations should belong to the protection scope of the appended claims of the present disclosure.

What is claimed is:

1. A method comprising:
improving a restoration speed of Transmission Control Protocol (TCP) connection at a destination physical machine during live migration of a virtual machine from a source physical machine to the destination physical machine by:
receiving, by a flow cache, a start instruction;
hooking, by the flow cache, a callback function of a processing logic to a virtual back-end network adapter of the destination physical machine that is directed to in the start instruction, and wherein the virtual back-end network adapter of the destination physical machine has a same configuration as a back-end network adapter of the source physical machine;
receiving, by the flow cache, a data packet that is sent to the virtual machine on the source physical machine directly from a peer with the flow cache pre-installed on the destination physical machine in a stage when the virtual machine is suspended;
caching, by the flow cache, the received data packet; and
sending, by the flow cache, the cached data packet to the virtual machine on the destination physical machine after the flow cache senses that the virtual machine is restored at the destination physical machine.

2. The method of claim 1, wherein the virtual back-end network adapter of the destination physical machine is a virtual network adapter of the destination physical machine for external communication.

3. The method of claim 1, further comprising:
before caching the received data packet,
determining that the received data packet is a TCP data packet; and
performing a subsequent processing.

4. The method of claim 1, further comprising:
before caching the received data packet,
determining that the received data packet is not a TCP data packet; and
performing no subsequent processing.

5. The method of claim 1, wherein caching the received data packet includes:
calculating a corresponding hash value according to a source IP, a source port, a destination IP, and a destination port of the data packet; and
saving the hash value as a Flow_Node.

6. The method of claim 5, further comprising:
placing Flow_Nodes having a same hash value in a single linked list of a same hash node.

7. The method of claim 6, wherein all hash nodes form a hash table.

8. The method of claim 5, wherein the Flow_Node saves a maximum of 3 data packets with largest TCP sequence numbers of a same TCP flow and 1 acknowledgement packet with a largest sequence number.

9. An apparatus comprises:
one or more processors;
memory coupled to the one or more processors, the memory storing a plurality of executable modules, executable by the one or more processors that when executed by the one or more processors causes the one or more processors to perform acts including:
improving a restoration speed of Transmission Control Protocol (TCP) connection at a destination physical machine during live migration of a virtual machine from a source physical machine to the destination physical machine by:
receiving, by a flow cache, a start instruction;
hooking, by the flow cache, a callback function of a processing logic to a virtual back-end network adapter of the destination physical machine that is directed to in the start instruction, and wherein the virtual back-end network adapter of the destination physical machine has a same configuration as a back-end network adapter of the source physical machine;
receiving, by the flow cache, a data packet that is sent to the virtual machine on a source physical machine directly from a peer with the flow cache pre-installed on the destination physical machine in a stage when the virtual machine is suspended;
caching, by the flow cache, the received data packet; and
sending, by the flow cache, the cached data packet to the virtual machine on the destination physical machine after the flow cache senses that the virtual machine is restored at the destination physical machine.

10. The apparatus of claim 9, wherein the virtual back-end network adapter of the destination physical machine is a virtual network adapter of the destination physical machine for external communication.

11. The apparatus of claim 9, wherein before caching the received data packet, a subsequent processing is performed if the received data packet is determined as a TCP data packet.

12. The apparatus of claim 9, wherein before caching the received data packet, no subsequent processing is performed if the received data packet is determined not to be a TCP data packet.

13. The apparatus of claim 9, wherein when caching the received data packet, a corresponding hash value is calculated according to a source IP, a source port, a destination IP, and a destination port of the data packet; the hash value is saved as a Flow_Node; and Flow_Nodes having a same hash value are placed in a single linked list of a same hash node.

14. The apparatus of claim 13, wherein all hash nodes form a hash table.

15. The apparatus of claim 13, wherein the Flow_Node saves a maximum of 3 data packets with largest TCP sequence numbers of a same TCP flow and 1 acknowledgement packet with a largest sequence number.

16. One or more memories stored thereon computer readable instructions that, when executed by one or more processors, cause the one or more processors to perform acts comprising:
improving a restoration speed of Transmission Control Protocol (TCP) connection at a destination physical machine during live migration of a virtual machine from a source physical machine to the destination physical machine by:
receiving, by a flow cache, a start instruction;
hooking, by the flow cache, a callback function of a processing logic to a virtual back-end network adapter of the destination physical machine that is directed to in the start instruction, and wherein the virtual back-end network adapter of the destination physical machine has a same configuration as a back-end network adapter of the source physical machine;

receiving, by the flow cache, a data packet that is sent to the virtual machine on the source physical machine directly from a peer with the flow cache pre-installed on the destination physical machine in a stage when the virtual machine is suspended;

caching, by the flow cache, the received data packet; and sending, by the flow cache, the cached data packet to the virtual machine on the destination physical machine after the flow cache senses that the virtual machine is restored at the destination physical machine.

17. The one or more memories of claim 16, wherein the virtual back-end network adapter of the destination physical machine is a virtual network adapter of the destination physical machine for external communication.

* * * * *